United States Patent [19]

Cella et al.

[11] Patent Number: 4,988,544
[45] Date of Patent: Jan. 29, 1991

[54] BISPHENOL-A DIANHYDRIDE-BASED POLYIMIDE MATRIX RESINS AND METHOD OF PREPARATION

[75] Inventors: James A. Cella, Clifton Park; Marsha M. Grade, Schenectady, both of N.Y.

[73] Assignee: General Electric Company, Schenectady, N.Y.

[21] Appl. No.: 288,842

[22] Filed: Dec. 23, 1988

[51] Int. Cl.⁵ ............................................... C08K 5/05
[52] U.S. Cl. .................................... 427/384; 428/288; 428/290; 524/379; 524/391
[58] Field of Search ............... 528/353, 125, 126, 128, 528/172, 179, 185, 207, 208; 427/384; 428/288, 290

[56] References Cited

U.S. PATENT DOCUMENTS

| | | | |
|---|---|---|---|
| 3,745,149 | 7/1973 | Serafini et al. | 528/288 |
| 3,847,867 | 11/1974 | Heath et al. | 528/185 |
| 3,890,272 | 6/1975 | D'Alelio | 528/353 |
| 4,197,339 | 4/1980 | Paul et al. | 528/353 |
| 4,244,853 | 1/1981 | Serafini et al. | 528/353 |
| 4,302,575 | 11/1981 | Takekoshi et al. | 528/185 |

OTHER PUBLICATIONS

"Thermally Stable Polyimides from Solutions of Monomeric Reactants", 16 J. Appl. Poly. Sci., 905 (1972).

Primary Examiner—Veronica P. Hoke
Attorney, Agent, or Firm—William H. Pittman; James C. Davis, Jr.

[57] ABSTRACT

A method for preparing high molecular weight highly thermal and oxidatively stable aryl polyimide compositions is provided which comprises reacting by application of heat, a mixture of bisphenol-A dianhydride, an aromatic diamine and a monoalkyl or dialkyl ester of a dicarboxylic acid or the corresponding anhydride.

5 Claims, No Drawings

BISPHENOL-A DIANHYDRIDE-BASED POLYIMIDE MATRIX RESINS AND METHOD OF PREPARATION

BACKGROUND OF THE INVENTION

The preparation by in situ polymerization of monomer reactants or polyimide matrix resins having thermal and oxidative stability and useful for preparing composites is well known. The in situ polymerization method is often referred to as the PMR method and the resulting resin as a PMR resin. In the PMR method, reinforcing fibers or fabric are impregnated with a solution containing a mixture of monomers dissolved in a low boiling alcoholic solvent. The monomers, essentially unreactive at ambient temperatures, polymerize in situ upon evaporation of the solvent and heating of the composite to a suitable reaction temperature. These highly processable polyimide resins are generally highly crosslinked addition-type resins which are suitable for use at temperatures in excess of 250° C.

The preparation of a commonly used PMR polyimide resin is described in U.S. Pat. No. 3,745,149. In such method a dialkyl ester of an aromatic tetracarboxylic acid or corresponding dianhydride, e.g. benzophenone dianhydride, an aromatic diamine and a monoalkyl ester of 5-norbornene-2,3-dicarboxylic acid or its corresponding anhydride, i.e. nadic anhydride, are dissolved in a low boiling point alcoholic solvent and the solution used to impregnate fibers. In situ polymerization of the monomer reactants to form the composite material occurs upon heating the impregnated fiber composite to an elevated temperature. The preparation of such PMR polyimide composites is also described in U.S. Pat. Nos. 4,197,339, 4,244,853 and 4,773,021. See also, Serafini, T. T., Status Review of PMR Polyimides, "Resins for Aerospace", ACS Symposium Series. May Ed., ACS Chapter 2, 15–24 (1980); Serafini, T. T., et al. "A Review of Processable High Temperature Resistant Addition-type Laminating Resins", Applied Polymer Symposium No. 22, 89–100, (1973); and Serafini, T. T., et al., "Thermally Stable Polyimides from Solutions of Monomeric Reactants", 16 J. Appl. Poly. Sci., 905 (1972).

There are, however, several shortcomings associated with such PMR polyimide resin formulations. In order to achieve workable resin flow during processing, relatively low molecular weight resins are necessarily utilized. The resulting cured material is highly crosslinked and tends to be somewhat brittle. Further, low formula molecular weight resins tend to be less thermally stable than the higher molecular weight versions.

SUMMARY OF THE INVENTION

In accordance with the present invention, it has now been found that high formula molecular weight PMR-type polyimide resins having process melt flow characteristics similar to known resins but which exhibit improved ductility and thermal-oxidative stability can be provided by a composition which comprises (A) an aromatic ether dianhydride of the formula

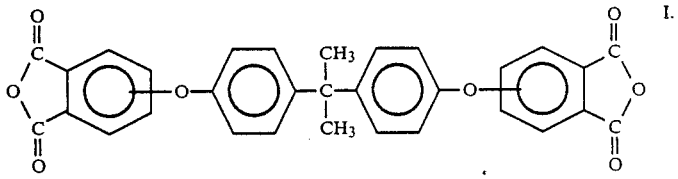

or the corresponding alkyl diesters or di-halfesters, (B) an aromatic diamine of the formula $H_2N$-R-$NH_2$, wherein R is a divalent aryl radical selected from the class consisting of aromatic hydrocarbon radicals having from 6–20 carbon atoms and halogenated derivatives thereof, alkylene radicals and cycloalkylene radicals having from 2–20 carbon atoms, alkylene terminated polydiorganosiloxane radicals having from 2–8 carbon atoms, and divalent radicals of the formula,

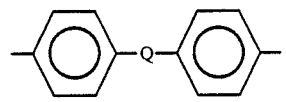

in which Q is a member selected from the class consisting of

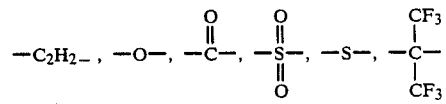

or a covalent bond, and (C) a monoalkyl or dialkyl ester of a dicarboxylic acid or the corresponding anhydride of the formulas:

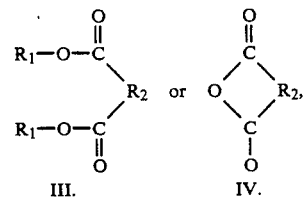

wherein $R_1$ is an alkyl or hydrogen and at least one of $R_1$ is an alkyl, and $R_2$ is a divalent radical of the formulas:

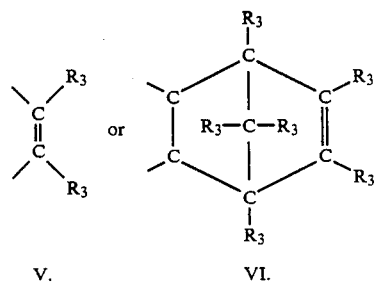

wherein $R_3$ is a lower alkyl of one to four carbon atoms or hydrogen. These resin-forming compositions are useful for making polyimide resin reinforced fiber or fabric composites.

The curable admixture of monomer reactants described above can be used to impregnate or infiltrate a mass of non-reactive material such as fibers, particles, beads, fabric and the like which will function as a strenghtening phase in the final product. The cured resin forms the matrix or continuous phase. The reactant monomers can then be partially cured to provide an article or product having some degree of cohesion and geometric shape, usually in the form of sheets or strips, which is then used to form the final shaped article which is then fully cured.

DETAILED DISCUSSION OF THE INVENTION

Representative examples of aromatic ether dianhydrides of formula I in component (A) include bisphenol-A dianhydride (2,2,-bis[4-(3,4-dicarboxyphenoxy)-phenyl]propane dianhydride and its symmetrical position isomer, 2,2-bis[4-2,3-dicarboxyphenoxy)phenyl]-propane dianhydride. Also contemplated, for use herein are the corresponding diesters or di-halfesters of such compounds. These compounds can be conveniently prepared from the corresponding polycarboximide, e.g. bisphenol-A bisimide, by an exchange reaction with phthalic acid or phthalic anhydride and water in the presence of dimethyl-n-butylamine as an exchange catalyst. The method of preparation is fully described in detail in U.S. Pat. No. 4,584,388 which is incorporated herein by reference.

Representative examples of diamines of formula II in component (B) suitable for use in the method of the present invention include 4,4'-methylenedianiline benzidine, 4.4'-thiodianiline, 4.4'-oxydianiline, 4.4-diaminodiphenyl sulfone, m-phenylenediamine and p-phenylenediamine. 4,4'-diamino benzophenone, 4,4'-diamino-diphenyl propane, 4,4'-diamino-diphenyl methane benzidine, 4,4'-diamino-diphenyl sulfide,4,4'-diamino-diphenyl sulfone, 3,3'-diamino-diphenyl sulfone, 4,4'-diamino-diphenyl ether, 1,5-diamino-naphthalene, benzidine, 3,3'-dimethoxy benzidine, 2,4-bis-(tetra-amino-t-butyl) toluene, bis-(para-beta-amino-t-butyl-phenyl) ether, bis-(para-beta-methyl-delta-amino-pentyl) benzene, bis-para-(1,1-dimethyl-5-amino-pentyl) benzene, 1-isopropyl-2,4-metaphenyl diamine, 1,3-diamino-4-isopropyl benzidine, m-xylene diamine, 3,3'-dimethyl benzidine, 1,3-bis(3-aminopropyl) tetramethyldisiloxane, and the like.

The mono- or dialkyl ester of the dicarboxylic acid defined in component (C) can be conveniently prepared from their particular corresponding anhydrides by methods well known in the art. Representative examples of such anhydrides suitable herein include maleic anhydride, citraconic anhydride, 3-norbornene-2,3-dicarboxylic anhydride, methyl-5-norbornene-2,3-dicarboxylic anhydride.

Preferably, an organic solvent is employed to dissolve the esters or anhydrides and diamine. A "suitable" solvent for purposes of the invention is one which does not react with the amines, anhydrides, or esters during processing. Examples of suitable solvents include N,N-dimethylformamide, N,N-dimethylacetamide, dimethyl sulfoxide, N-methylpyrrolidone, aliphatic alcohols, aliphatic alcohol-ethers, and alkylbenzenes, for example, xylene, and mixtures of two or more of such solvents.

A preferred PMR monomer mixture comprises a methyl alcohol solution of monomers bisphenol-A dianhydride (BPADA), 4,4'-methylenedianiline (MDA), and 5-norbornene-2.3-dicarboxylic acid anhydride (NA).

Typically, in preparing PMR-type polyimide resins it has been found convenient to describe the molar ratio of components (A):(B):(C) as being n:n+1:2 wherein n is the number of moles of component (A) and has a value of from 1 to 20, preferably 1 to about 5, the compounds being present in an amount of 30 to 70% by weight of the solution.

The formula molecular weight (FMW) of the resulting resins (nominal molecular weight, MW, prior to cross-linking) thus depends on the mole fraction of component (C), a polymer chain capping agent, as delineated in the following equation:

$$FMW = \underset{(A)}{n(MW)} + \underset{(B)}{(n+1)(MW)} +$$

$$\underset{(C)}{2(MW)} - 2(n+1)(MW)H_2O + \underset{solvent.}{(MW)}$$

In practice, depending upon the end uses contemplated, the optimal FMW is chosen for a PMR-type polyimide resin which combines the most desirable properties of thermo-oxidative stability, flexibility and processing conditions as measured by melt viscosity.

In accordance with the method of the present invention, the composition comprising a solution in an organic solvent of the aromatic ether dianhydride (or corresponding diester), aromatic diamine and mono- or dialkyl ester of a dicarboxylic acid (or corresponding anhydride), components (A), (B) and (C), respectively, can be impregnated into fibers or fabric and the impregnated material heated at an elevated temperature from about 60° C. to about 200° C. to form a prepreg material comprising polyimide prepolymer having a molecular weight of about 2,500 to about 36,000 and having improved ductility and thermal-oxidative stability properties. The prepreg material can then be subsequently heated to a higher temperature of about 200° C. to about 300° C. in a final curing step to effect formation of the polyimide thermoset resin reinforced product. It is believed, without intending to limit the scope of the invention, that when heated at higher temperatures the endcapped portion of the molecule becomes reactive and chain extension and cross-linking occur to form high molecular weight thermally stable polyimides.

A preferred embodiment of the method of the present invention involves dissolution of the appropriate dianhydrides of components (A) and (B), respectively, in boiling methanol to obtain a homogeneous solution containing half esters of the anhydride moieties. The appropriate aromatic diamine of component (C) is then added to produce the final PMR solution for impregnating formation and subsequent final curing. As discussed above, the solvent is conveniently removed and the monomers allowed to react by heating at a temperature of from about 60° C. to about 200° C. to obtain high molecular weight polyimides within 40 minutes to 2 hours. FMW of the cured thermoset resins can range as high as 35,000.

The curable compositions of this invention are useful in the formation of combinations or composites of two or more materials which are present as separate phases and form structures having the benefit of the desirable properties of each component or material. More particularly, a mass of fibers whether in mat or woven form can be impregnated with the curable composition to form an intermediate product or article in which the fibers are infiltrated by the curable composition. The solvent is removed and the composition partially cured to form a product having some adhesion and sufficient drape to permit the formation of complex shapes which are subsequently fully cured. Depending on the shape and dimensions of the article, the initial partial cure and the final cure can be completed in a single stage or in multiple stages. The term prepreg is often used to describe the partially cured article or product and is used in that context herein.

The following examples illustrate the practice of the present invention.

EXAMPLES 1–7

The following examples illustrate the method of the present invention which provides a high molecular weight polyimide resin composition exhibiting improved ductility and thermo-oxidative stability over currently known polyimide resins. A series of resins having varying formula molecular weight (FMW) are prepared in accordance with the present invention by dissolving bisphenol-A dianhydride (BPADA) and cis-5-norbornene-endo-2,3-anhydride (nadic anhydride or NA) in boiling methanol to obtain a homogeneous solution containing halfesters of the anhydride moieties. 4,4'-methylene-dianiline (MDA) is then added to produce the final polymerizable PMR solution of composition and formula molecular weight as summarized in Table I below.

Comparative Example 8 is conducted as described above, except that benzophenone dianhydride (BTDA) is substituted for bisphenol-A dianhydride to prepare a conventional PMR-polyimide resin (PMR-15).

TABLE I

| Example # | Dianhydride | Dianhydride/MDA/NA (n/(n + 1)/2) | FMW$^a$ |
|---|---|---|---|
| 1 | BPADA | 2/3/2 | 1900 |
| 2 | BPADA | 5/6/2 | 4000 |
| 3 | BPADA | 10/11/2 | 7500 |
| 4 | BPADA | 20/21/2 | 14500 |
| 5 | BPADA | 30/31/2 | 22000 |
| 6 | BPADA | 40/41/2 | 29000 |
| 7 | BPADA | 50/51/2 | 36500 |
| 8 | BTDA | 2/3/2 | 1500 |

$^a$the equation of the FMW for the purposes of this example of a PMR polyimide from n moles of dianhydride, (n + 1) moles of MDA and 2 moles of NA is:

FMW = n(MW)$_{dianhydride}$ + (N+1)(MW)$_{MDA}$ − 2(n+1)(MW)$_{H_2O}$ + (MW)$_{MeOH}$ where MW$_{dianhydride}$, MW$_{MDA}$, etc., are the molecular weights of the monomer reactants and by products.

The solutions of Examples 1–8 are then poured into glass dishes and heated in stages at temperature of from 60° C. to 200° C. for 1–2 hours, followed by heating at temperatures of from 200° C. to 300° C. for an additional 2 hours to remove solvent and to allow the monomers to react. The respective polymer films obtained after the thermal cycling steps are then further heated for approximately one hour at a temperature of from 300° C. to 315° C. under 500 psi in a Carver press to effect final curing.

During the hot press stage of the curing cycle, all of the resins in Examples 1–7 exhibit improved processability over Comparative Example 8, to produce clear flexible films.

Evaluation of the thermal-oxidative stability of the thus cured resin films is accompanied by heating the films contained in open glass vials in air at 315° C. and gravimetrically determining the weight loss of the samples at timed intervals. Such testing reveals similar stability for BPADA and BTDA resins of similar composition (13.2% and 11.4% weight loss for Examples 1 and 8, respectively) after 48 hours at 315° C. Higher molecular weight PMR-polyimide resins employing BPADA are, however, shown to be more stable (7.1% and 7.6% weight loss for Examples 4 and 5, respectively after 48 hours at 315° C.) than the conventional resin of Comparative Example 8.

We claim:

1. A method for preparing a polyimide composite which comprises the steps of impregnating a fiber composition with a solution in at least one aliphatic alcohol of a monomer mixture comprising (a) an aromatic ether dianhydride of the formula

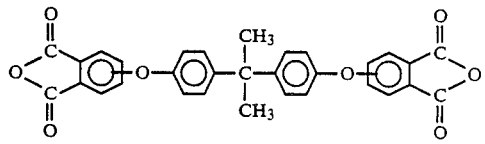

or a corresponding alkyl diester or di-halfester;

(b) an aromatic diamine of the formula H$_2$N-R-NH$_2$, wherein R is a divalent aryl radical selected from the class consisting of aromatic hydrocarbon radicals having 6–20 carbon atoms and halogenated derivatives thereof, alkylene radicals and cycloalkylene radicals having 2–20 carbon atoms, C$_{2-8}$ alkylene-terminated polydiorgansiloxane and divalent radicals of the formula

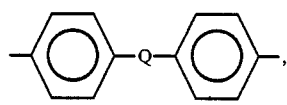

wherein Q is a covalent bond,

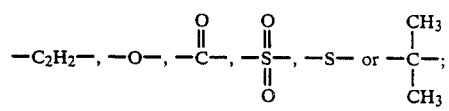

and (c) a monoalkyl or dialkyl ester of a dicarboxylic acid, or a corresponding dianhydride, having the formula

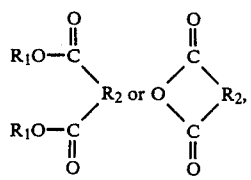

wherein R$_1$ is alkyl or hydrogen and at least one R$_1$ is alkyl, and R$_6$hd 2 is a divalent radical of the formula

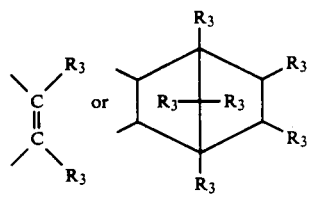

wherein $R_3$ is hydrogen or $C_{1-4}$ lower alkyl; effecting in situ polymerization of said monomers at a temperature in the range of 60–300° C.; the molar ratio of reagents A, B and C being n:(n+1):2, wherein n is from 1 to 20.

2. A method according to claim 1 wherein reagent A is bisphenol A dianhydride, reagent B is 4,4,'-methylene dianiline and reagent C is 5-norbornene-2,3-dicarboxylic anhydride.

3. A method according to claim 1 wherein n is 1–5.

4. A method according to claim 1 wherein the alcohol comprises 30–70% by weight of the solution.

5. A method according to claim 4 wherein the alcohol is methanol.

* * * * *